United States Patent [19]

Malay

[11] Patent Number: 5,712,058
[45] Date of Patent: Jan. 27, 1998

[54] MINIATURE GALVANIC CELL HAVING OPTIMUM INTERNAL VOLUME FOR THE ACTIVE COMPONENTS

[75] Inventor: Manuel R. Malay, Brunswick, Ohio

[73] Assignee: Eveready Battery Company, Inc., St. Louis, Mo.

[21] Appl. No.: 722,754

[22] Filed: Sep. 27, 1996

[51] Int. Cl.$^6$ ............................................. H01M 6/46
[52] U.S. Cl. ............................................. 429/162; 429/174
[58] Field of Search ............................ 429/162, 163, 429/174, 185, 153, 164

[56] References Cited

U.S. PATENT DOCUMENTS

| | | | |
|---|---|---|---|
| 4,018,970 | 4/1977 | Jumel et al. | 429/162 |
| 4,172,183 | 10/1979 | Ruetschi | 429/162 X |
| 4,238,555 | 12/1980 | Uetani et al. | 429/163 |
| 4,302,517 | 11/1981 | Dziak | 429/174 X |
| 4,404,266 | 9/1983 | Smilanich | 429/27 |
| 4,525,439 | 6/1985 | Simonton | 429/162 |
| 5,576,117 | 11/1996 | Morita et al. | 429/162 |

*Primary Examiner*—Anthony Skapars
*Attorney, Agent, or Firm*—Robert W. Welsh

[57] ABSTRACT

A miniature galvanic cell employing a cover-gasket assembly in which the gasket component occupies less than 8% of the internal volume of the cell and a process for producing the galvanic cell.

14 Claims, 1 Drawing Sheet

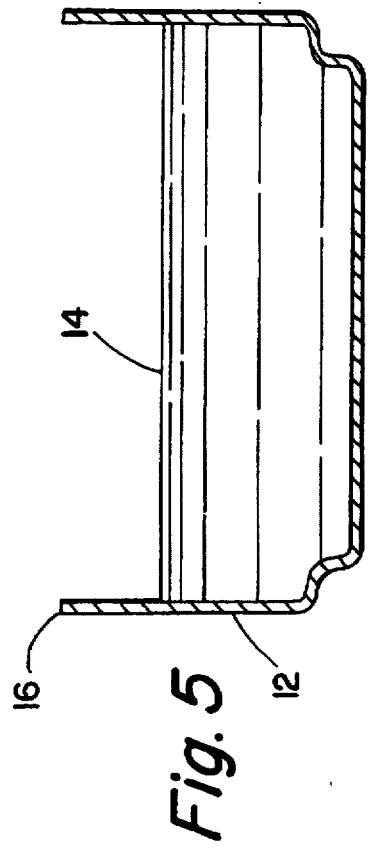
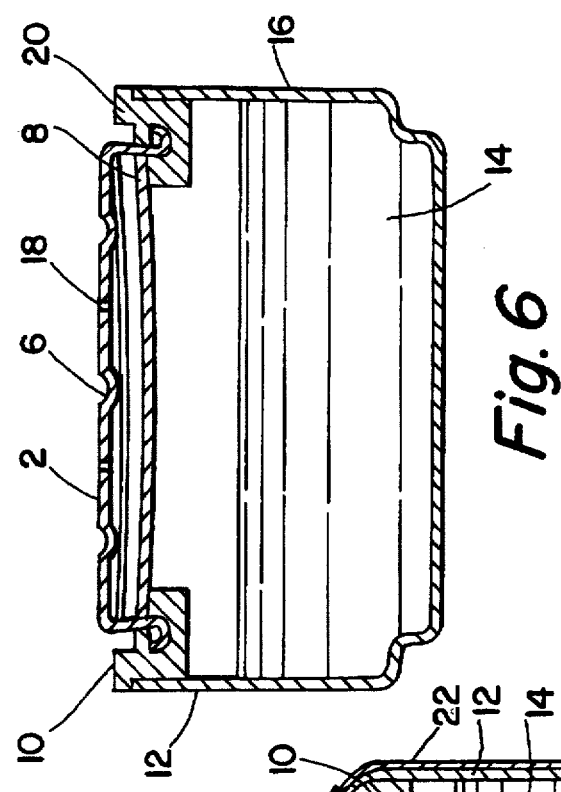
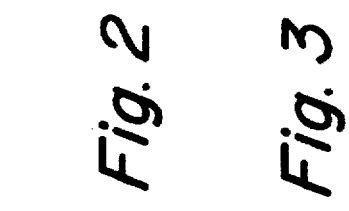
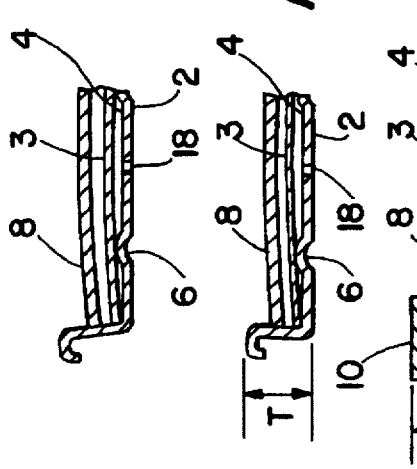
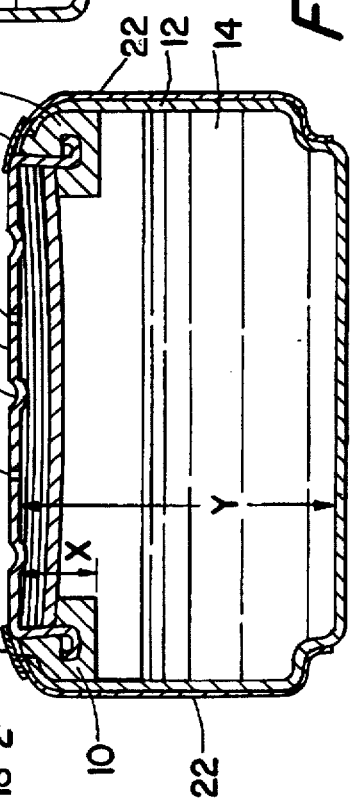
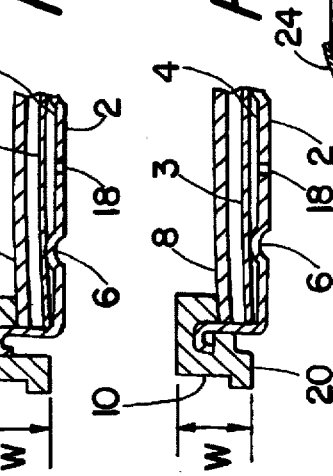

MINIATURE GALVANIC CELL HAVING OPTIMUM INTERNAL VOLUME FOR THE ACTIVE COMPONENTS

FIELD OF THE INVENTION

This invention relates to a miniature type of galvanic coin cell employing a cover-gasket assembly that occupies a relatively small volume so that the internal volume of this cell is reserved primarily for the active components of the cell. This invention also relates to a process for producing a miniature galvanic cell having optimum internal volume for the active components of the cell.

BACKGROUND OF THE INVENTION

The miniaturization of electronic devices has created a demand for small but powerful electrochemical cells. Cells that utilize an alkaline electrolyte are known to provide high energy density per unit volume, and are therefore well suited for applications in miniature electronic devices such as hearing aids, watches and calculators. However, alkaline electrolytes, such as aqueous potassium hydroxide and sodium hydroxide solutions, have an affinity for wetting metal surfaces and are known to creep through the sealed metal interface of an electrochemical cell. Leakage in this manner can deplete the electrolyte solution from the cell and can also cause a corrosive deposit on the surface of the cell that detracts from the cell's appearance and marketability. These corrosive salts may also damage the device in which the cell is housed. Typical cell systems where this problem is encountered include silver oxide-zinc cells, nickel-cadmium cells, air depolarized cells, and alkaline manganese dioxide cells.

In the prior art it has been a conventional practice to incorporate insulating gaskets between the cell container and cover so as to provide a seal for the cell. Generally, the gasket must be made of a material inert to the electrolyte contained in the cell and the cell environment. In addition, it had to be flexible and resistant to cold flow under pressure of the seal and maintain these characteristics so as to insure a proper seal during long periods of storage. Materials such as nylon, polypropylene, ethylene-tetrafluoroethylene copolymer and high density polyethylene have been found to be suitable as gasket materials for most applications. Typically, the insulating gasket is in the form of a "J" shaped configuration in which the extended wall of the cover is inserted so that upon being radially squeezed, the bottom portion of the gasket forms a seal with the bottom portion of the wall of the container. The gasket generally extends the entire length of the internal wall of the cell. The volume of the gasket is generally in excess of 20% of the internal volume of the cell and therefore results in a waste of space in the cell for the active components of the cell. To better insure a good seal, a sealant is generally applied in the "J" shaped seal so that upon insertion of the cover into the gasket, the edge of the extended wall of the cover will seat in the sealant and then upon the application of a radial squeeze, the gasket will be compressed against the bottom portion of the extended cover wall.

U.S. Pat. No. 4,302,517 discloses a sealed galvanic cell employing an insulating gasket between the cover and the container of the cell which is composed of a first sealing segment disposed and compressed between the rim of the cover and the edge of the container and a second cover support segment extending within the container and substantially parallel to the wall of the container and defining a plurality of spaced apart openings which accommodate the cell's electrolyte and/or the cell's reaction product.

It is an object of the present invention to provide a miniature cylindrical cell structure that employs a low profile gasket that occupies less than 8% of the internal volume of the cell.

It is another object of the present invention to provide a gasket-cover assembly for a miniature cylindrical cell in which the circular cover is secured within a low profile type gasket and the gasket is compressed between the rim of the cover and the edge of the container to provide a sealed miniature cell having a large internal volume for the active components of the cell.

It is another object of the present invention to provide a process for producing a miniature cell with a gasket for sealing the cell that occupies less than 8% of the internal volume of the cell.

The foregoing and additional objects of the present invention will become more fully apparent from the following description and accompanied drawings.

DESCRIPTION OF THE INVENTION

The invention relates to a galvanic cell having a negative electrode; a positive electrode; a separator between said negative and said positive electrode; and an electrolyte dispersed within a two-part conductive housing, the first part of the conductive housing being a cylindrical cupped container being electrically connected to one of the electrodes and the second part of the housing being a circular cover having a peripheral flange, said cover being electrically connected to the other electrode and wherein said first part container and said second part cover are electrically insulated from each other by an insulating gasket disposed between and compressed between the edge of the container and the peripheral flange of the cover, thereby defining an enclosed volume within said housing; the improvement wherein the height of the cylindrical cupped container is greater than 4 times the height of the circular cover and the flange of the cover is disposed within and secured within the insulating gasket and the thickness of the gasket is no greater than 1.3 times the height of the cover. As used herein, the thickness of the gasket is designated as "W" in FIGS. 3 and 4 and the height of the cover is designated as "T" in FIG. 2. In a preferred embodiment of the invention, the insulating gasket will occupy less than 8% of the internal volume of the cell.

In the preferred embodiment of the invention the flange of the cover would form a u-shaped contour and the u-shaped contour would be anchored and secured within the insulating gasket and the insulating gasket would be compressed between the flange of the cover and the edge of the container. The height of the cylindrical container should be greater than 4 times the height of the circular cover, preferably greater than 8 times the height of the cover and more preferably greater than 10 times the height of the cover. The thickness of the gasket should be no greater than 1.3 times the height of the cover, preferably no greater than 1.2 times the height of the cover and most preferably no greater than 1.1 times the height of the cover. The insulating gasket should preferably occupy less than 8% of the internal volume of the cell, preferably less than 5% and more preferably less than 3% of the internal volume of the cell. An easy way of determining the internal volume of a cylindrical cell is to multiply the area of the plane defined by the open end of the container by the height of the container. The volume of the gasket ring can be determined by multiplying the cross sectional area of the gasket by the circumference which is $2\pi r$ where r is the distance from the centroid (center of mass) of the cross sectional area of the gasket to the central axis of the gasket ring. The volume of the gasket should be less than 8% of the internal volume of the container (cell). Preferably, the height of the insulating gasket, measured from the inner wall of the cover, should be less than 20% of the height of the container measured from the internal bottom wall of the container to the inner wall of the cover, preferably less than 17% and more preferably less than 15% of the height of the container measured from the internal bottom wall of the container to the inner wall of the cover.

Typically, the wall of the cover extends down the wall of the container and has a rolled back construction utilized for providing stability to the cell upon the radial forces exerted upon the cell during closure. In this invention, elimination of the rolled back cover provides an increase in internal volume for active materials in the container; for example for an AC675 cell, a 17% increase in internal volume was realized. The peripheral flange locates the cover assembly prior to closing, and provides support upon the radial compressive forces exerted upon the cell during closure.

Another embodiment of this invention relates to a process for assembling the components of a cell into a two-part conductive housing in which one part is a cylindrical container and the other part is a circular cover and the height of the cylindrical container is at least greater than 4 times the height of the circular cover, comprising the steps:

(a) preparing a cover with a protruding peripheral flange rim;

(b) preparing an insulating gasket ring with an annulus groove defined in the ring;

(c) inserting the peripheral flange rim of the cover into a groove in the gasket ring and using reformation means to force the wall defining the groove in the gasket ring into the peripheral flange rim, thereby anchoring the cover into the insulating gasket to provide a cover-gasket assembly so that the thickness of the gasket is no greater than 1.3 times the height of the cover;

(d) preparing a container with an edge defining the opening of the container and placing the cover gasket assembly at the edge of the container with the components of the cell within the container and cover; and (e) compressing the gasket between the container and the cover, so as to effectively seal the cover and electrically isolate said cover from the container.

Preferably the cover in step (a) would be provided with a protruding peripheral flange terminating in a u-shaped contour rim and the u-shaped contour rim can be secured within the groove in the ring by using reformation means such as ultrasonic means.

Elastic waves of frequencies beyond the range of audibility are called ultrasonic waves. These waves are conventionally produced by quartz crystal oscillators designed for producing frequencies ranging from up to 200 to 300 kilocycles per second or higher. These ultrasonic waves can be used to produce a steady force against an object. It is this force means that can be used in the present invention to secure the rim of a cover into a groove in the gasket to provide an excellent seal between the gasket and the rim of the cover. The force to be applied to secure the rim of the cover into the groove of the gasket has to be sufficient so that the gasket forms a "u"-shaped seal about the rim of the cover. Thus the settings of an ultrasonic welder has to be adjusted depending on the material of the cover and the composition of the gasket. Once these data are selected, a conventional ultrasonic welder can be used to secure the rim of a cover into the groove of a gasket.

In some applications, a sealant may be used between the rim of the cover wall and the groove of the gasket. Once the gasket-cover assembly is produced, it is preferable to assemble the cathode of the cell into the gasket-cover assembly and then the gasket-cover-cathode assembly is placed within a container of a cell housing the other active and inactive components of the cell system. The container is then squeezed against the gasket-cover assembly forming a seal for the cell. Specifically, the gasket-cover assembly could be sealed to a container of the cell by crimping the top portion of the container sidewall over the outer upstanding wall of the gasket thereby compressing the gasket between the container and cover so as to effectively seal said cover to and electrically insulating said cover from the container.

The sealing gasket of this invention comprises a material selected with consideration given to its stability in the presence of the electrolyte, its resiliency, and its resistance to cold flow. Suitable polymeric materials are selected from the group consisting of nylon, polytetrafluoroethylene, fluorinated ethylene-propylene, ethylene copolymer with fluorinated ethylene-propylene, chlorotrifluroethylene, perfluoro-alkoxy polymer, polyvinyls, polyethylene, polypropylene, polystyrene and the like. Other suitable materials would be recognizable by one skilled in the art. In some applications, additional precautions can be used in conjunction with the gasket of this invention to provide a more effective seal, such as coating the flange of the gasket surfaces with a sealant or an adhesive agent (such as a fatty polyamide resin). The sealing gasket of this invention is amenable to production techniques such as injection molding. Preferably the gasket would be nylon. The container could be made of monel, copper, clad stainless steel, or some other conductive materials. Preferably, the container would be a triclad cover made of nickel, stainless steel and copper. However, the container should be made of a conductive material that will not corrode or otherwise deteriorate when in contact with the materials of the cell. The cover for the cell could be made of stainless steel, iron, nickel, nickel-plated steel, or some other conductive materials.

Typical cell systems in which this invention can be used are alkaline manganese dioxide cells, air depolarized cells, nickel-cadmium cells and silver oxide-zinc cells.

BRIEF DESCRIPTION OF THE DRAWINGS

The present invention will become apparent from the following description thereof when considered together with the accompanying drawings which are set forth as being exemplary of embodiments of the present invention and are not intended, in any way, to be limitative thereof and wherein:

FIG. 1 is a partial cross-sectional view of an air electrode in a low profile cover.

FIG. 2 is a partial cross-sectional view of the air electrode in the cover of FIG. 1 with the outer diameter of the cover reduced.

FIG. 3 is a partial cross-sectional view of the air electrode and cover of FIG. 2 in which a "J"-shaped gasket is snapped on the cover.

FIG. 4 is a partial cross-sectional view of the gasket-cover assembly of FIG. 3 after the u-shaped rim of the cover was ultrasonically secured into the groove of the gasket.

FIG. 5 is a cross-sectional view of a container containing a zinc-based electrode.

FIG. 6 is a cross-sectional view of the gasket-cover assembly of FIG. 4 that is inverted and then placed on and into the .open end of the container.

FIG. 7 is a cross-sectional view of the cell of FIG. 6 after it was crimped to provide a sealed cell and having a metallized shrink-type film secured to the outer surface of the container.

DETAILED DESCRIPTION OF THE DRAWINGS

FIG. 1 shows a circular cover 2 with an air distribution membrane 4 secured to the inner surface of the cover 2. A layer of polytetrafluoroethylene 3 covers the entire bottom of the cover 2 including the air distribution membrane 4. The cover 2 has patterned internal embossed sections 6 to provide a defined gap for uniform air distribution across the surface of an electrode 8 which is disposed within cover 2. The internal embossed section 6 could comprise one annular section or one or more arcuate sections which would be equally spaced apart. The internal embossed sections 6 serves three purposes:

(1) to provide a defined gap between the inside of the cover 2 and the air electrode 8 for uniform air distribution;

(2) it eliminates the need for a distribution membrane and adhesive application to retain and locate the membrane prior to other operations; and (3) it stiffens the cover bottom, minimizing dishing or bulging during the final cell closing. The air electrode 8 is positioned adjacent the inside surface of the polytetrafluoroethylene layer 3. The air electrode 8 contains several components including a metal screen, a mixture of manganese oxides and carbon embedded in the metal screen, a barrier film which prevents the anode's electrolyte leaking out of the cell and a soak up separator.

As shown in FIG. 2, the outer diameter of cover 2 is reduced through the use of a reform die or the like to form a negative tapered wall. This results in slanting the wall of the cover to further secure the air electrode to the cover.

As shown in FIG. 3, an insulating gasket ring 10 is snapped to the rim of the cover 2 and as shown in FIG. 4, ultrasonic means were used to seal the "u"-shaped rim of the cover 2 into the groove of gasket 10. FIG. 5 shows a container 12 with an anodic mixture 14 of zinc powder, placed in the container and making electronic contact with the container 12. The anode mixture 14 can comprise a mixture of zinc particles, electrolyte and organic compounds such as binders which make up the battery's anode. The container 12 can be made from a trilaminate material comprising copper that has been laminated to the bare side of a nickel-clad steel strip. A nickel layer could be used to protect the exterior surface of the steel strip. Other laminated materials from which the container may be made include: a bilaminate of copper on a stainless steel substrate or alaminate made from more than three layers. Round disks punched from this laminated metal strip are then formed into a container. The copper layer forms the inside surface of the container and directly contacts the anodic mixture.

As shown in FIG. 2, the cover 2 having a height of "T", along with the inserted air electrode 8 and associated membranes, are inverted over and pressed against and onto the container which is preassembled according to this invention and containing the anode. As shown in FIGS. 6 and 7, while the cover is inverted, the edge of the anode container 12 is crimped inwardly. The rim 16 of the container is then compressed against the gasket 10 between the container 12 and the cover 2 thereby forming a seal and an electrical barrier between the cover 2 and the container 12. As shown in FIGS. 2 through 4, the thickness "W" of the gasket 10 is no greater than 1.3 times the height "T" of the cover.

As shown in FIGS. 1 through 7, two small holes 18 are punched into the bottom of cover 2 to act as air- entering ports. The gasket 10 has a peripheral flange 20 that seats on the rim of container 12 so that the gasket-cover assembly can be easily aligned with the container 12.

As shown in FIG. 7, the height "X" of the gasket 10 is about 20% of the height "Y" of the container 12 measured from the inner surface of the cover 2 and the bottom surface of the container 12. As shown in FIG. 7, the volume of the gasket 10 is less than 8% of the internal volume of the cell. Consequently, a greater percentage of the internal volume of the cell can be used for the active components of the cell and therefore the cell will have a greater energy capacity for a given size cell.

The cell shown in FIG. 7 has the cover 2 in electrical contact with electrode 8 and the container 12 in electrical contact with electrode 14 and thus the terminals of the cell are at opposite ends. In one embodiment of the invention, a metallized film can be used to carry the polarity of electrode 8 to the outside diameter of the cell for applications that require side contact. As shown in FIG. 7, a metallized film 22 could be secured to the outer wall of container 12 using an adhesive or the like with the inner surface of the film being an insulative layer. The outer surface of the film would be a conductive surface that would contact the cover 2 and thereby adapt the metallized film as the terminal of electrode 8 for the cell. To electrically connect the conductive surface of the metallized film 22 to the cover, a conductive material such as a conductive paint 24, could be applied to the conducting side of the metallized film 22 and the cover 2.

It is to be understood that modifications and changes to the preferred embodiment of the invention herein shown and described can be made without departing from the spirit and scope of the invention.

What is claimed:

1. A galvanic cell having a negative electrode; a positive electrode; a separator between said negative and said positive electrode; and an electrolyte dispersed within a two-part conductive housing, the first part of the conductive housing being a cylindrical cupped container having an edge and being electrically connected to one of the electrodes and the second part of the housing being a circular cover having a peripheral flange, said cover being electrically connected to the other electrode and wherein said first part container and said second part cover are electrically insulated from each other by an insulating gasket disposed between and compressed between the edge of the container and the peripheral flange of the cover, thereby defining an enclosed volume within said housing; the improvement wherein the height of the cylindrical cupped container is greater than 4 times the height of the circular cover and wherein the thickness of the gasket is no greater than 1.3 times the height of the cover.

2. The galvanic cell of claim 1 wherein the gasket occupies less than 8% of the internal volume of the cell.

3. The galvanic cell of claim 1 wherein the container contains the positive electrode and the cover contains the negative electrode.

4. The galvanic cell of claim 1 wherein the flange of the cover forms a u-shaped contour and said u-shaped contour is anchored and secured within the insulating gasket and the insulating gasket is compressed between the flange of the cover and the edge of the container.

5. The galvanic cell of claim 1 wherein the cover has at least one embossed section facing the inside of the cell.

6. The galvanic cell of claim 5 wherein the cover has at least two spaced apart embossed sections facing the inside of the cell and said two embossed sections are disposed at opposite sides of the center of the cover.

7. The galvanic cell of claim 5 wherein the embossed section is an annular section.

8. The galvanic cell of claim 5 wherein the embossed sections are arcuate sections equally spaced apart.

9. The galvanic cell of claim 4 wherein the cover has at least two spaced apart embossed sections facing the inside of the cell and said embossed sections are disposed at opposite sides of the center of the cover.

10. The galvanic cell of claim 1 wherein a metallized film is secured to the outer wall of the container, said film comprising a layer on the bottom of the film contacting the container that is an insulating layer and an outer metallized layer contacting the cover thereby adapting the metallized film as the polarity of the cover.

11. The galvanic cell of claim 10 wherein a conductive paint is used to electrically connect the metallized layer to the cover.

12. The galvanic cell of claim 10 wherein the flange of the cover forms a u-shaped contour and said u-shaped contour is anchored and secured within the insulating gasket and the insulating gasket is compressed between the flange of the cover and the edge of the container.

13. The galvanic cell of claim 10 wherein the cover has at least one spaced apart embossed section facing the inside of the cell and said embossed section is disposed at opposite sides of the center of the cover.

14. The galvanic cell of claim 1 wherein the gasket is made of a material selected from the group consisting of nylon, polytetrafluoroethylene, fluorinated ethylene-propylene, ethylene copolymer with fluorinated ethylene-propylene, chlorotrifluoroethylene, perfluoroalkoxy polymer, polyvinyls, polyethylene, polypropylene and polystyrene.

* * * * *